United States Patent
Ramanathan et al.

(10) Patent No.: US 10,637,877 B1
(45) Date of Patent: Apr. 28, 2020

(54) NETWORK COMPUTER SECURITY SYSTEM

(71) Applicant: Wells Fargo Bank, N.A., San Francisco, CA (US)

(72) Inventors: Ramanathan Ramanathan, San Francisco, CA (US); Rama Rao Yadlapalli, Hyderabad (IN); Ajay Kumar Rentala, Hyderabad (IN); Vamsi Krishna Geda, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 221 days.

(21) Appl. No.: 15/063,898

(22) Filed: Mar. 8, 2016

(51) Int. Cl.
 *H04L 9/00* (2006.01)
 *H04L 29/06* (2006.01)
(52) U.S. Cl.
 CPC ...... *H04L 63/1425* (2013.01); *H04L 63/1441* (2013.01)
(58) Field of Classification Search
 CPC .................................................. H04L 63/1425
 See application file for complete search history.

(56) References Cited

U.S. PATENT DOCUMENTS

| | | | |
|---|---|---|---|
| 6,324,168 B1 | 11/2001 | Richardson | |
| 7,089,594 B2 | 8/2006 | Lal et al. | |
| 7,805,531 B2 | 9/2010 | Groll et al. | |
| 8,239,953 B1 | 8/2012 | Satish et al. | |
| 8,443,452 B2 | 5/2013 | Koulinitch et al. | |
| 9,361,458 B1* | 6/2016 | Feng | G06F 21/564 |
| 2012/0255018 A1* | 10/2012 | Sallam | G06F 12/14 726/24 |
| 2013/0111216 A1* | 5/2013 | Kiehtreiber | H04L 9/3239 713/187 |
| 2016/0072830 A1* | 3/2016 | Goel | H04L 63/1425 726/23 |
| 2016/0261611 A1* | 9/2016 | Heilig | H04L 63/1425 |

\* cited by examiner

*Primary Examiner* — Jeffrey Nickerson
*Assistant Examiner* — Syed M Ahsan
(74) *Attorney, Agent, or Firm* — Merchant & Gould P.C.

(57) ABSTRACT

At an electronic computing device, a first memory footprint is obtained for a protected computer. The protected computer is monitored with the electronic computing device. At the electronic computing device, a second memory footprint is obtained for the protected computer. The first memory footprint is compared with the second memory footprint. When the first memory footprint does not match the second memory footprint, a security alert is initiated for the protected computer.

13 Claims, 5 Drawing Sheets

ନetwork computer security system

NETWORK COMPUTER SECURITY SYSTEM

BACKGROUND

Computer systems that are connected to a network such as the Internet can be subjected to a variety of threats and attacks. The threats and attacks can impact the integrity and reliability of computer programs and data on the computer systems. The threats and attacks can also affect an operational performance of the computer systems.

Security systems can be used to attempt to identify and thwart the threats and attacks on the computer systems. The security systems can include components such as firewalls and intrusion protection systems.

SUMMARY

Embodiments of the disclosure are directed to a method implemented on an electronic computing device for monitoring a protected computer, the method comprising: at the electronic computing device, obtaining a first memory footprint for the protected computer; monitoring the protected computer with the electronic computing device; at the electronic computing device, obtaining a second memory footprint for the protected computer; comparing the first memory footprint with the second memory footprint; and when the first memory footprint does not match the second memory footprint, initiating a security alert for the protected computer.

In another aspect, an electronic computing device comprising: a processing unit; and system memory, the system memory including instructions which, when executed by the processing unit, cause the electronic computing device to: obtain a first signature for a protected computer, the first signature comprising a first unique memory pattern associated with an operational aspect of the protected computer; receive a message at the protected computer with the electronic computing device; after the message is received, obtain a second signature for the protected computer, the second signature comprising a second unique memory pattern associated with the operational aspect of the protected computer; compare the first signature with the second signature; and when there is a disparity between the first signature and the second signature, initiate a security alert for the protected computer.

In yet another aspect, an electronic computing device includes a processing unit; and system memory, the system memory including instructions which, when executed by the processing unit, cause the electronic computing device to: obtain a first memory footprint for a software application on a protected computer, the first memory footprint comprising a state of random access memory of the protected computer in a memory range in which the software application is stored in the random access memory of the protected computer; after a time interval, obtain a second memory footprint for the software application on the protected computer; comparing the first memory footprint with the second memory footprint; when the first memory footprint does not match the second memory footprint, initiate a security alert for the protected computer; obtain a first signature for the protected computer, the first signature comprising a first unique memory pattern associated with an operational aspect of the protected computer; receive a message at the protected computer; after the message is received, obtain a second signature for the protected computer, the second signature comprising a second unique memory pattern associated with the operational aspect of the protected computer; compare the first signature with the second signature; and when there is a disparity between the first signature and the second signature, initiate the security alert for the protected computer.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods that support computer security. Using the systems and methods, a physically separate electronic computing device can be used to monitor a protected computer, such as a server computer, on a network. The electronic computing device can be programmed to detect malware, malicious payloads or other security issues on the protected computer while minimizing the impact of the malware, malicious payloads and other security issues on the electronic computing device.

In this disclosure, the device to be monitored is referred to as the protected computer. The protected computer is a computing device such as a server computer, a desktop computer, a laptop computer, etc. Other types of computing devices can also be monitored.

As stated, the electronic computing device is a physically separate device electronic computing device. The electronic computing device has its own housing including its own central processing unit (CPU), memory and input/output (I/O) ports. The electronic computing device also includes proprietary software. The proprietary software can permit the electronic computing device to monitor the protected computer and determine whether there are any security issues with the protected computer.

The electronic computing device can include one or more mechanisms for establishing a direct connection between the electronic computing device and the protected computer. For example, the electronic computing device can include a universal serial bus (USB) port. A direct connection can be made between a USB port on the electronic computing device and a USB port on the protected computer. Data stored in memory on the protected computer can be transmitted to the electronic computing device using the USB port. The electronic computing device can also include a small computer system interface (SCSI) for making a direct connection to the protected computer. Other mechanisms for a direct connection are possible.

The electronic computing device can be configured to act as a proxy device for the protected computer. All messages and data that are sent to the protected computer over the network are also sent to the electronic computing device. However, the electronic computing device is configured with restricted memory to prevent software applications, including malware, from being stored. Using the systems and methods, an initial memory footprint of the protected computer is created when software applications are loaded into memory on the protected computer. The memory footprint comprises a state of memory (for example a state of random access memory (RAM) on the protected computer) when the software applications are loaded into the memory of the protected computer. The electronic computing device initiates the creation of the memory footprint and stores a copy of the memory footprint. The electronic computing device can periodically obtain a new memory footprint from the protected computer and compare the new memory footprint with the initial memory footprint created when the software applications are loaded. Because the electronic computing device stores the initial memory footprint, the electronic computing device can compare the initial memory footprint with the new memory footprint on a byte by byte basis. When memory on the protected computer is corrupted with malware, the new memory footprint can be different than the initial memory footprint. When the electronic computing device determines that there is a difference between a new memory footprint and the initial memory footprint, the electronic computing device can flag the protected computer for a security error and/or stop operations on the protected computer.

Using the systems and methods, a signature can also be created on the electronic computing device when a software application is loaded on the protected computer. The signature can comprise a unique number that can be associated with an operational aspect of the protected computer. For example, the unique number can be obtained from a dynamic state of the protected computer at a time the software application is loaded. Some examples of dynamic states of the protected computer that can be a base for the unique number can include dynamics of central processing unit (CPU) cycle speed, dynamics of memory, dynamics of input and output traffic and aspects of how the protected computer behaves overall. As an example of dynamics of CPU cycle speed, a sum of computer cycles can be calculated for executing a specific number of lines of code at a beginning of the software application and a CPU cycle speed can be calculated from those computer cycles. An example of dynamics of memory can comprise memory usage at the protected computer. An example of dynamics of input and output traffic can be a number of bytes of message and data that can be received at an input port of the protected computer or transmitted out of an output port.

A hash function can be applied to a specific dynamic state chosen to generate the unique number that comprises the signature. In some implementations, the unique number can be obtained from code at another place in the application, such as an end of the application. In some implementations, the unique number can be used at multiple places in the application, such as the beginning and the end.

As discussed in more detail later herein, the signature can be evaluated at periodic intervals to determine whether malware has been added to the protected computer and to determine whether any malicious payloads are being applied to the protected computer. For example, when a malicious event occurs, such as a denial of service attack, the signature can change on the protected computer. When the electronic computing device compares the current signature with the signature that was originally loaded and determines that there is a difference, the electronic computing device can flag the protected computer for a security error and stop operations on the protected computer. An example of how the signature can change on the protected computer when the a malicious event occurs is that the cycle time for executing lines of code at the beginning of the application can change during the malicious event. Other examples are possible.

As discussed earlier herein, the electronic computing device can calculate and store both a memory footprint and a signature when a software application is loaded. In addition, any time a new version of the software application is installed and loaded on the protected computer, the electronic computing device can calculate a new memory footprint and signature and replace any previously stored memory footprint and signatures for the software application with the new memory footprint and signature. This prevents false security violations during subsequent security processing.

The electronic computing device periodically monitors the protected computer, obtains a memory snapshot of the protected computer and calculates a new signature. The memory snapshot can comprise a current memory footprint of memory on the protected computer. The electronic computing device can periodically compare the current memory footprint and current signature with the memory footprint and signature generated when the software application is loaded to determine whether a security violation has occurred. If a new program attempts to access the protected computer when a security violation has been detected, the electronic computing device can stop the new program from accessing the protected computer.

In addition to the memory footprint and one or more signatures, an assembly language program for the application can be monitored to determine whether security violations have occurred. The assembly language program can comprise assembly language commands that correspond to higher level program language statements in the software application. If malicious code is introduced into the protected computer, the assembly language program can change. The electronic computing device can obtain a listing of assembly language commands when the software application is loaded, obtain a listing of assembly language commands at a later time and determine whether there are any deviations between the listings of assembly language commands. Any deviations can indicate a security violation at the protected computer.

The systems and methods disclosed herein are directed to a computer technology that solves an existing problem in identifying security issues on a computer system. The identification of security issues can improve computer efficiencies in an organization by minimizing the effects of malware and malicious payloads on the computer system. In addition, the use of a monitoring device external to the computer system being monitored can improve efficiencies at the computer system being monitored. The computer system being monitored can focus on a primary task of processing messages and data and not need to waste computer cycles by monitoring itself for security issues.

Figure 1:
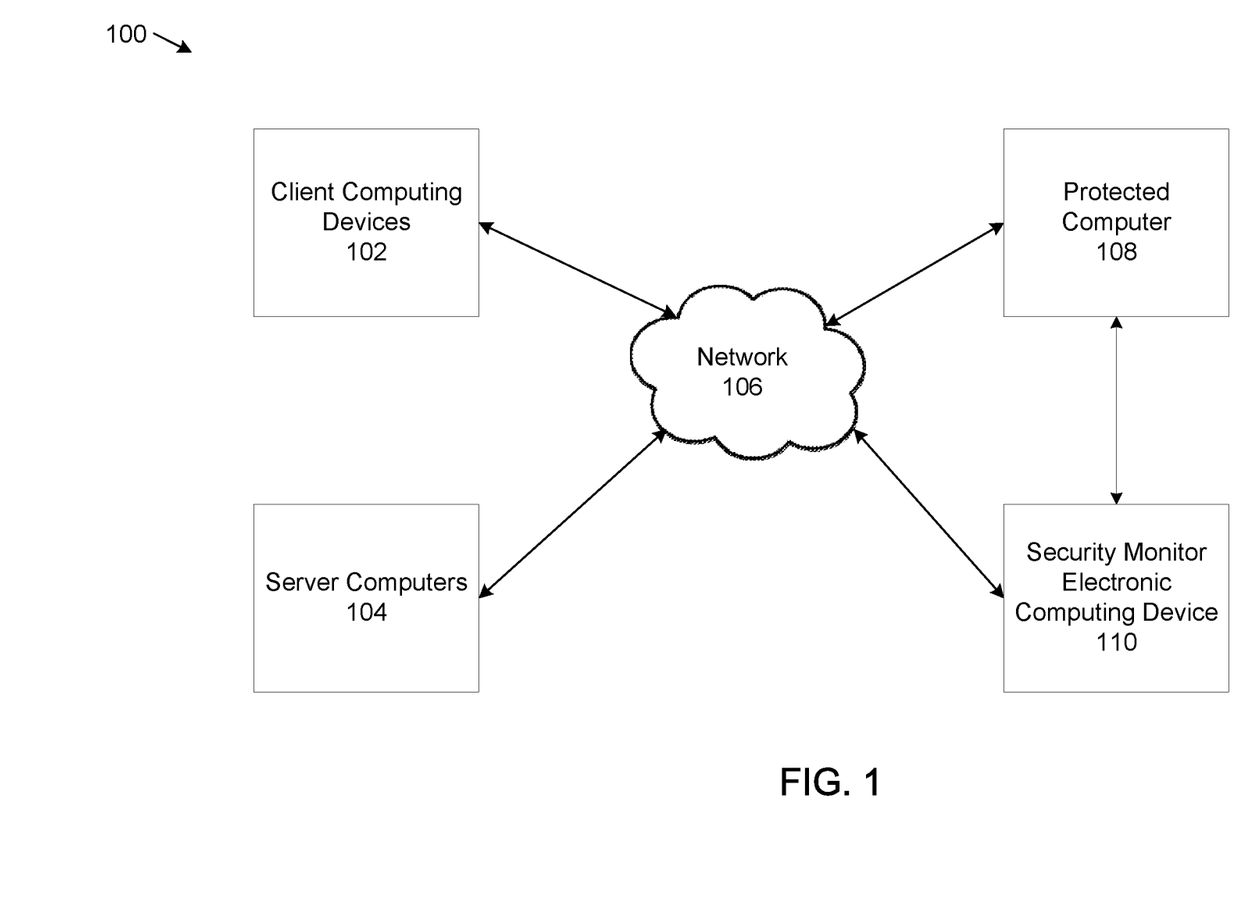
FIG. 1 shows an example system that supports a network computer security system.

FIG. 1 shows an example system 100 that supports a network computer security system. The example system 100 includes client computing devices 102, server computers 104, a network 106, a protected computer 108 and a security monitor electronic computing device 110. More, fewer or other computing devices are possible.

The example client computing devices 102 can be desktop computers, laptop computers, tablet computers, smartphones and other electronic computing devices that can connect to one or more other electronic computing devices across network 106. For example, the other electronic computing devices can include one or more of server computers 104 and protected computer 108.

The example server computers 104 are server computers that can be connected across network 106 to client computing devices 102 and to protected computer 108. For example, the server computers 104 can be server computers of a business or other organization or the server computers 104 that are authorized to access each other and to access the protected computer 108.

The example network 106 is computer network that can permit communication between one or more of client computing devices 102, server computers 104 and protected computer 108. Network 106 can comprise a corporate Intranet and network 106 can also include the Internet.

The example protected computer 108 is a server computer that is connected to network 106 and is therefore able to access and be accessed by other devices such as client computing devices 102 and server computers 104 that are also connected to network 106. The protected computer 108 can be monitored for security issues by the security monitor electronic computing device 110, as discussed next, herein.

The example security monitor electronic computing device 110 is an electronic computing device, for example a client computer or a server computer that is configured to act as a proxy computing device to the protected computer 108. The security monitor electronic computing device 110 is configured to receive all messages and data, including software applications that are sent to the protected computer 108.

The security monitor electronic computing device 110 can be at a same domain server level as the protected computer 108. However, the security monitor electronic computing device 110 has its own IP address. In addition, the security monitor electronic computing device 110 is configured to have restricted memory so that software applications, including malware, cannot be loaded onto the security monitor electronic computing device 110.

Figure 2:
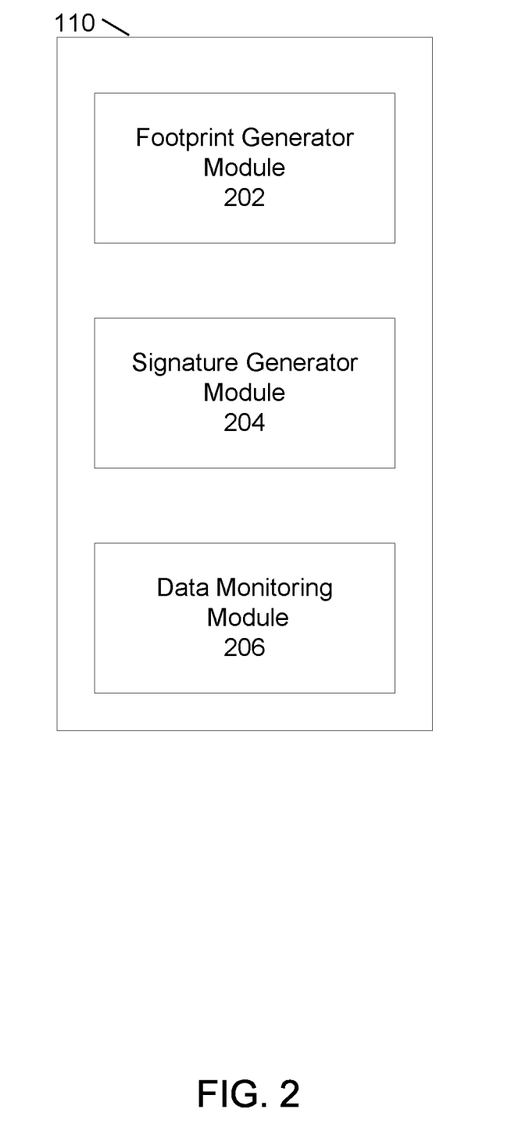
FIG. 2 shows example modules of the security monitor electronic computing device of FIG. 1.

FIG. 2 shows example modules of the security monitor electronic computing device 110. The security monitor electronic computing device 110 includes a footprint generator module 202, a signature generator module 204 and a data monitoring module 206.

The example footprint generator module 202 can access random access memory (RAM) on the protected computer and generate a memory footprint corresponding to the accessed memory. Memory to be accessed can correspond to a predetermined portion of memory on a software application that is loaded into the RAM. In some implementations, a predetermined number of bytes of binary code starting at a beginning of the RAM for the software application are accessed. In other implementations, a predetermined percentage of the bytes of binary code in RAM for the software application are accessed. In other implementations, the portion of RAM access can start at a location other than the beginning of the RAM for the software application.

The memory to be accessed can be obtained via a direct connection between the electronic computing device and the protected computer. The direct connection can be via a USB port, a small computer system interface (SCSI) connection, a slot on the protected computer or via other means.

In an example implementation, the memory footprint generated by the footprint generator module 202 can comprise a pattern of accessed bytes in the RAM. The pattern can be stored on the electronic computing device and compared byte for byte with future memory footprints. In other implementations, the memory footprint can comprise certain aspects of the memory that is accessed. For example, the memory footprint can comprise a checksum of all bytes accessed. Other types of memory footprints can be generated.

The example signature generator module 204 can generate a unique signature for the protected computer based on a dynamic operational aspect of the protected computer. A dynamic operational aspect can be an operational aspect that can change over time based on conditions in the protected computer. Some example dynamic operational aspects are CPU cycle speed for a specific section of application program code, dynamic aspects of memory such as memory usage at different periods of time and a level of input and output traffic. As an example, the signature generator module 204 can calculate CPU cycles used to execute a specific number of lines of software application program code and then calculate a total time of execution for these CPU cycles. A hash function can be applied to the total time of execution of the CPU cycles to generate a signature. Other examples are possible.

In some implementations, the signature generator module 204 can obtain the signature from lines of code at a start of the software application. In some implementations, the signature generator module 204 can obtain the signature from lines of code at an end of the software application. In other implementations, multiple signatures can be used—for example based on lines of code at the start and end or other positions of the software application.

The example data monitoring module 206 monitors an operation of the protected computer to check for security risks and performance issues that can suggest a security issue. On a periodic basis, the data monitoring module 206 can access memory on the protected computer and calculate additional memory footprints for the protected computer. When an additional memory footprint doesn't match an initial memory footprint stored on the protected computer, a security alert can be issued. For example, one reason the additional memory footprint doesn't match the additional memory footprint is that malware has altered RAM for the software application. The security alert can result in operations being halted at the protected computer until the security issue is resolved.

The data monitoring module 206 can also calculate additional signatures for the protected computer on a periodic basis. For example, the data monitoring module 206 can calculate another value for CPU cycle time for a same number of lines of program code as for the initial calculation of CPU cycle time. If malware has been inserted into the software application, there generally will be different instructions used during the CPU cycle time calculation, and therefore the additional signature will be different from the initial signature. The CPU cycle time can also be different from an initial calculation of the CPU cycle time because of a malicious payload, for example during a denial of service attack. When a malicious payload is received, additional CPU cycles may be executed because of time outs, retries and other issues. When the additional signature does not match the additional signature, a security alert can be issued.

The data monitoring module 206 can also obtain assembly language code from the protected computer from a same number of lines of program code as previously obtained. The newly obtained assembly language code can be hashed and the hashed values of the newly obtained assembly language code and the previously obtained assembly language code can be compared. When the two hash values do not match, a security issue may be indicated. Malware inserted into the software application results in different assembly language statements than for the assembly language code that was initially loaded. When the hash value for the newly obtained assembly code does not match the hash value for the initial assembly code, a security alert can be issued.

Figure 3:
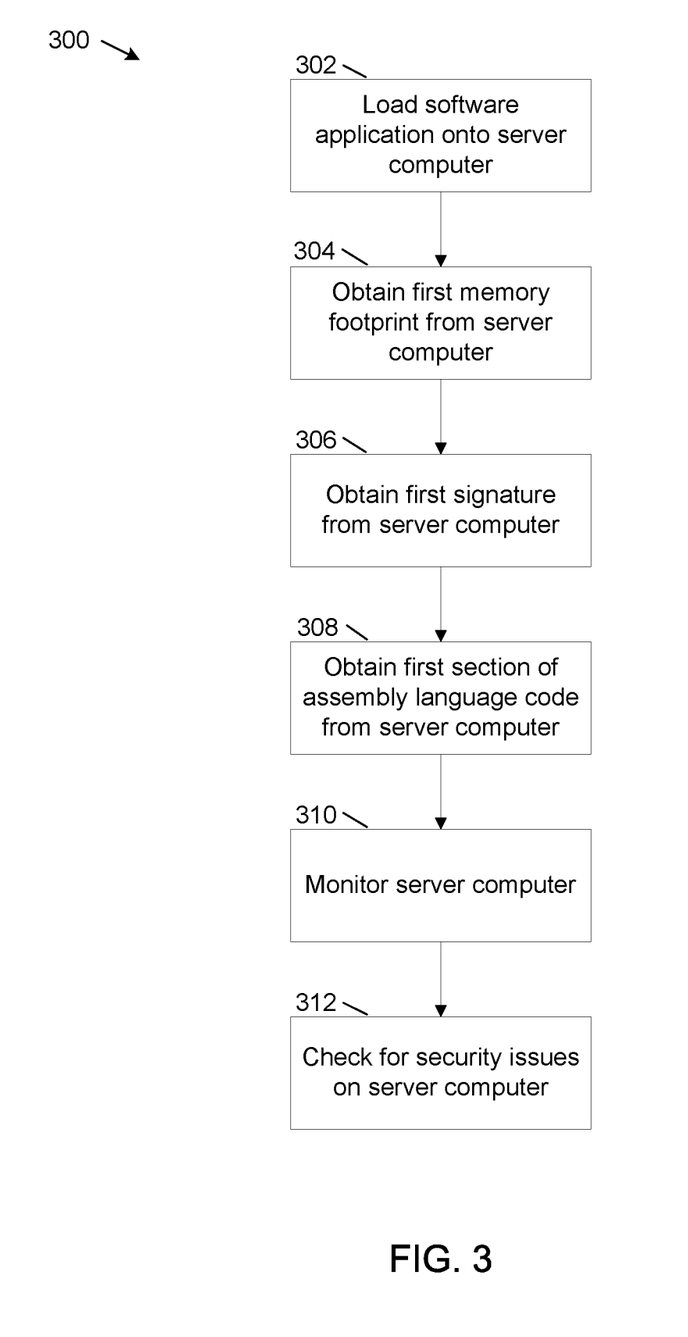
FIG. 3 shows a flowchart of an example method for monitoring a network computer.

FIG. 3 shows a flowchart of an example method 300 for monitoring a network computer for possible security issues. As used in this disclosure, a network computer is a computer system that is connected to a network and accessible by other devices on the network. For method 300, the network computer being monitored is a protected computer, for example protected computer 108.

At operation 302, a software application is loaded onto the protected computer. For example, the software application can be downloaded to the protected computer across the network from another server computer. The software application can be any software application that is configured to run on the protected computer. An example software application can be a credit card transaction processing software application for a financial institution.

At operation 304, a first memory footprint is obtained from the protected computer by an electronic computing device. For example, the electronic computing device can be the security monitor electronic computing device 110. The electronic computing device is configured to be a proxy device for the protected computer. All messages and data that are sent to the protected computer are also sent to the electronic computing device. However, the memory of the electronic computing device is protected, so that malware (for example malware that can be introduced into the first software application) is not loaded into the memory of the electronic computing device.

For operation 304, the first memory footprint is obtained by reading a random access memory (RAM) of the protected computer in a memory range starting at a memory location at which the first software application is loaded and ending at a memory location corresponding to an end of the first software application. In other implementations the first memory footprint can comprise other RAM memory ranges for the first software application.

At operation 306, a first signature is obtained from the protected computer. The first signature comprises unique memory pattern associated with an operational aspect of the protected computer. Example operational aspects of the protected computer can include CPU cycle speed, dynamics of memory and input/output traffic. Other operational aspects are possible. The first signature is obtained by applying a hash function to a numerical value associated with the operational aspect. For example, the numerical value can comprise a number of CPU cycles needed to execute a specific number of lines of code from the start of the software application. The first signature can comprise a hash function applied to this numerical value.

At operation 308, a first section of assembly language code is obtained from the protected computer. The first section of assembly language can comprise assembly language statements corresponding to a predetermined number of lines of program code of the first software application. A hash function can be applied to the first section of assembly language to generate a numerical value that can be used for comparison.

At operation 310, the protected computer is monitored by the electronic computing device. The monitoring of the protected computer comprises obtaining one or more of additional memory footprints, signatures and assembly language listings on a periodic basis. The monitoring of the protected computer can also comprise periodically checking operational aspects of the protected computer.

Figure 4:
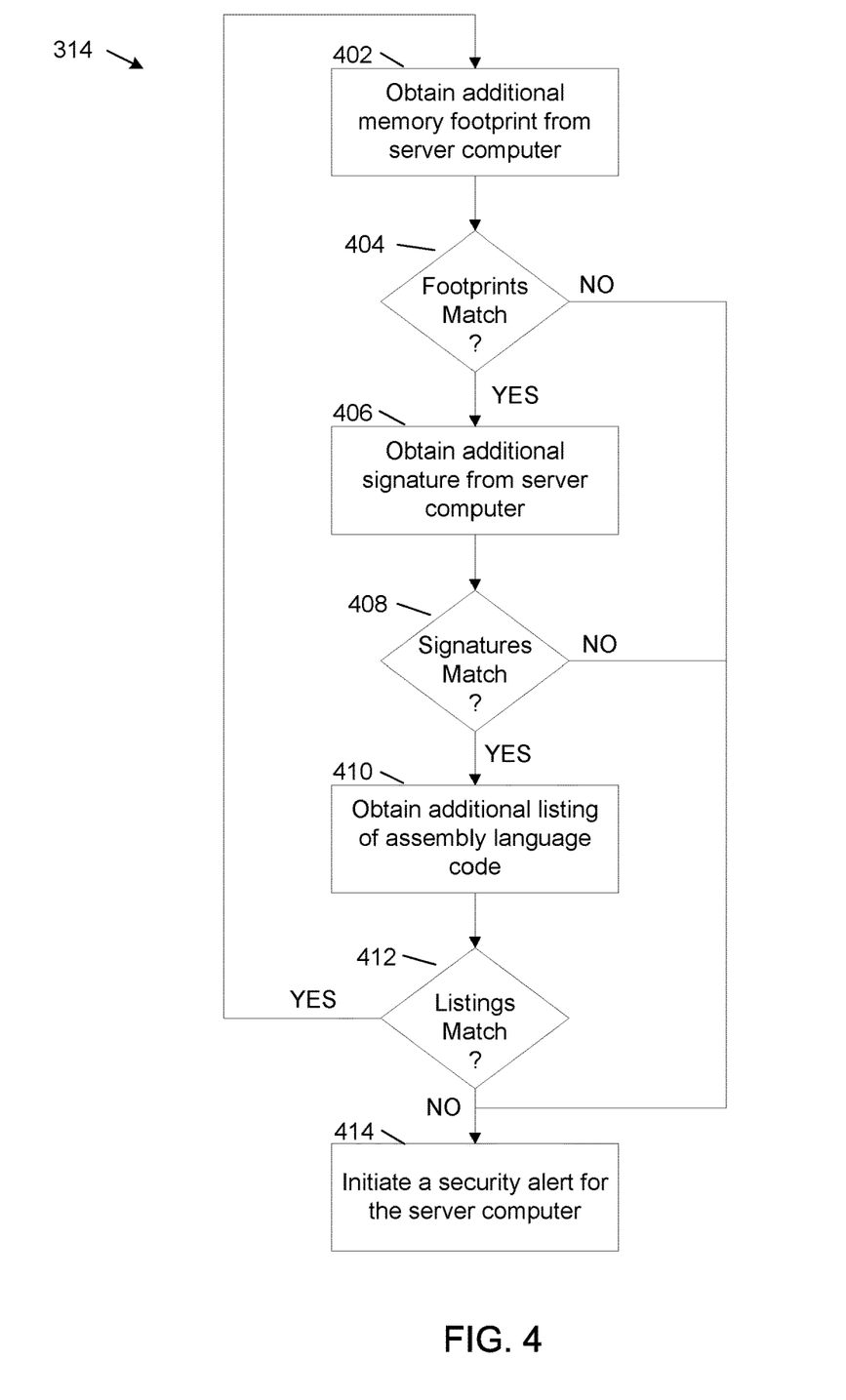
FIG. 4 shows a flowchart of an example method for checking for security issues for the method of FIG. 3.

At operation 312, the electronic computing device checks for security issues on the protected computer, based on the monitoring performed at operation 310, as discussed in more detail with regard to FIG. 4.

FIG. 4 shows a flowchart of the example operation 312 for checking for security issues on the protected computer.

At operation 402, an additional memory footprint is obtained from the protected computer. The additional memory footprint can be obtained at a time interval after the first memory footprint is obtained. For example, the additional footprint can be obtained at one second after the first memory footprint is obtained. Other time intervals are possible.

At operation 404, a determination is made as to whether there is a match between the first footprint and the additional footprint. When a determination is made that there is not a match, indicating that the memory footprint has changed, control passes to operation 414.

When a determination is made that the footprints do match, at operation 406, an additional signature is obtained from the protected computer. The additional signature can comprise a hash of a same operational aspect used to generate the first signature. For example, the additional signature can comprise a hash of a number of CPU cycles needed to execute the same number of lines of code as for the first signature. A disparity between the first signature and the additional signature can indicate that malware may be been added to the protected computer or that a malicious payload may have been sent to the protected computer. Because both the first signature and the additional signature each comprise a hash number, the disparity between the first signature and the second signature can be determined by comparing the hash number corresponding to the first signature with the hash number corresponding to the additional signature.

At operation 408, a determination is made as to whether there is a match between the first signature and the second signature. When a determination is made that there is not a match, indicating a possible security issue, control advances to operation 414.

When a determination is made that the first signature does match the additional signature, at operation 410, an additional listing of assembly language code is obtained and a hash function is applied to the additional listing of assembly language code.

At operation 412, a determination is made as to whether there is a match between the hash of the first listing of assembly language code and the additional listing of assembly language code. When a determination is made that the listings match, control returns to operation 402 and, at an appropriate time interval, another additional memory footprint is obtained from the protected computer.

When a determination is made that the listings do not match, indicating a possible security issue, at operation 414 a security alert is initiated for the protected computer. As a result of the security alert, a severity of the possible security issue can be determined. Depending on the severity of the security issue, operations at the protected computer can be disabled.

Figure 5:
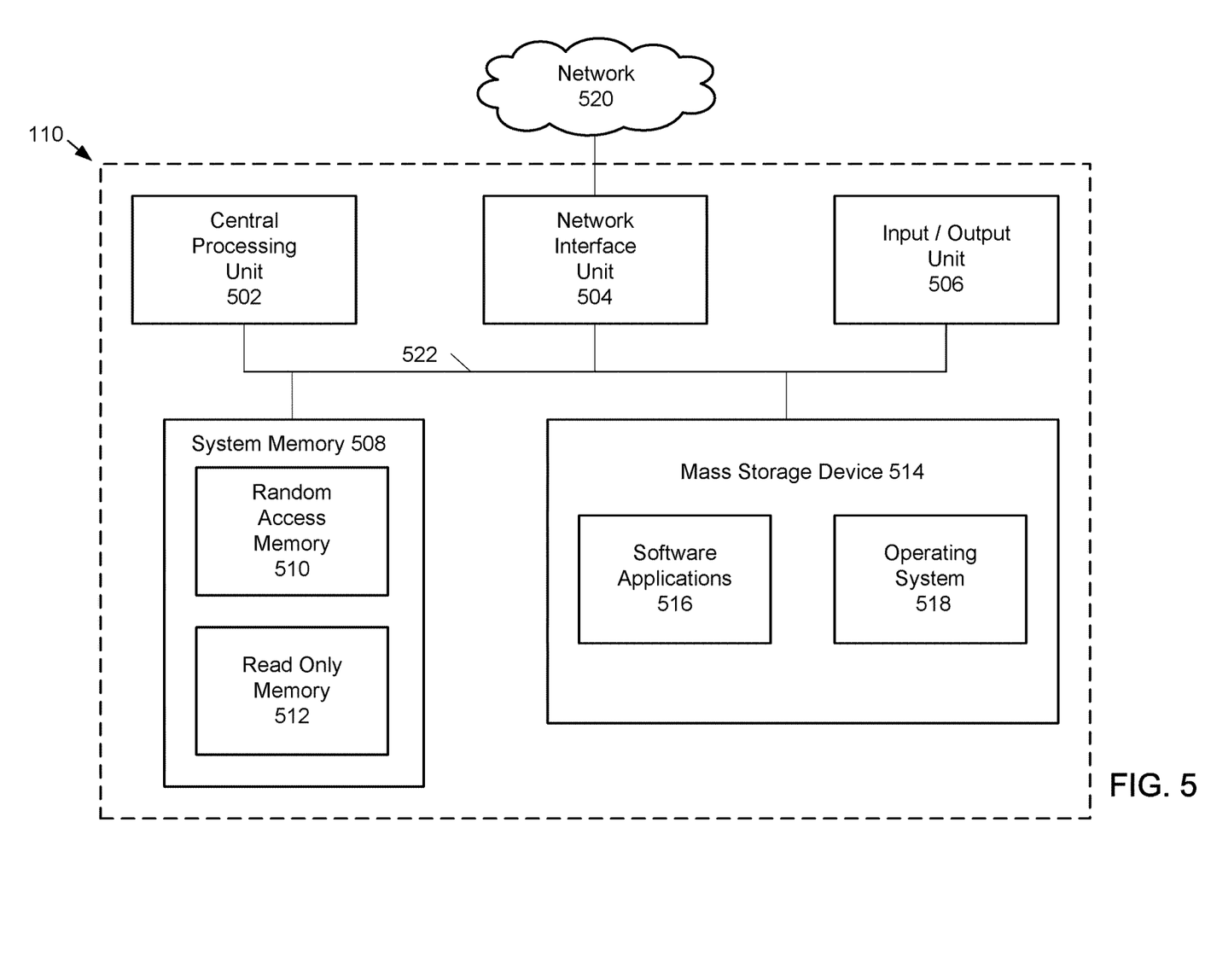
FIG. 5 shows example physical components of the protected computer of FIG. 1.

As illustrated in the example of FIG. 5, security monitor electronic computing device 110 includes at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system that contains the basic routines that help to transfer information between elements within the security monitor electronic computing device 110, such as during startup, is stored in the ROM 512. The security monitor electronic computing device 110 further includes a mass storage device 514. The mass storage device 514 is able to store software instructions and data. Some or all of the components of the security monitor electronic computing device 110 can also be included in protected computer 108.

The mass storage device 514 is connected to the CPU 502 through a mass storage controller (not shown) connected to the system bus 522. The mass storage device 514 and its associated computer-readable data storage media provide non-volatile, non-transitory storage for the security monitor electronic computing device 110. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the security monitor electronic computing device 110.

According to various embodiments of the invention, the security monitor electronic computing device 110 may operate in a networked environment using logical connections to remote network devices through the network 520, such as a wireless network, the Internet, or another type of network. The security monitor electronic computing device 110 may connect to the network 520 through a network interface unit 504 connected to the system bus 522. It should be appreciated that the network interface unit 504 may also be utilized to connect to other types of networks and remote computing systems. The security monitor electronic computing device 110 also includes an input/output controller 506 for receiving and processing input from a number of other devices, including a touch user interface display screen, or another type of input device. Similarly, the input/output controller 506 may provide output to a touch user interface display screen or other type of output device.

As mentioned briefly above, the mass storage device 514 and the RAM 510 of the security monitor electronic computing device 110 can store software instructions and data. The software instructions include an operating system 518 suitable for controlling the operation of the security monitor electronic computing device 110. The mass storage device 514 and/or the RAM 510 also store software instructions, that when executed by the CPU 502, cause the security monitor electronic computing device 110 to provide the functionality of the security monitor electronic computing device 110 discussed in this document. For example, the mass storage device 514 and/or the RAM 510 can store software instructions that, when executed by the CPU 502, cause the security monitor electronic computing device 110 to display received data on the display screen of the security monitor electronic computing device 110.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for monitoring a protected computer, the method comprising:

configuring the electronic computing device to have restricted memory that prevents malware from being loaded onto the electronic computing device;

at the electronic computing device, obtaining a first signature for the protected computer, the first signature comprising a computer processor cycle speed for executing a specific number of lines of code for a predetermined section of a first software application on the protected computer, the electronic computing device being a separate physical electronic computing device from the protected computer;

obtaining a first memory footprint for the first software application on the protected computer, the obtaining of the first memory footprint comprising reading a random access memory of the protected computer in a memory range in which the first software application is stored in the random access memory of the protected computer, the first memory footprint comprising a memory pattern in the random access memory;

monitoring the protected computer with the electronic computing device;

after a time interval, obtaining a second memory footprint for the first software application on the protected computer;

comparing the first memory footprint with the second memory footprint;

when the first memory footprint does not match the second memory footprint, initiating a security alert on the protected computer;

at the electronic computing device, obtaining a second signature for the protected computer, the second signature comprising a computer processor cycle speed for executing the specific number of lines of code for the predetermined section of the first software application on the protected computer after monitoring the protected computer with the electronic computing device;

comparing the first signature with the second signature; and when the first signature does not match the second signature, initiating a security alert for the protected computer, wherein the electronic computing device that performs the monitoring and comparing is the separate physical electronic computing device.

2. The method of claim 1, wherein monitoring the protected computer comprises periodically accessing a memory on the protected computer.

3. The method of claim 2, wherein the memory is accessed via a direct connection between the electronic computing device and the protected computer.

4. The method of claim 1, wherein the first signature is based on lines of code at a start of the first software application.

5. The method of claim 1, wherein the first signature is created by applying a hash function to a numerical value associated with the operational aspect of the protected computer, the numerical value being obtained from a dynamic state of the protected computer at a time the first software application is loaded.

6. The method of claim 1, wherein the operational aspect of the protected computer comprises the first sum of computer cycles for executing the specific number of lines of code for the predetermined section of the first software application starting at a beginning of the first software application or starting near an end of the first software application.

7. The method of claim 1, wherein the operational aspect of the protected computer comprises memory usage of the protected computer.

8. The method of claim 1, wherein after the first software application is loaded, further comprising:
   obtaining first assembly language statements for a predetermined number of lines of program code for the first software application starting from a beginning of the first software application;
   monitoring the protected computer with the electronic computing device;
   obtaining second assembly language statements for the predetermined number of lines of program code for the first software application starting from a beginning of the first software application;
   comparing the first assembly language statements with the second assembly language statements; and
   when the first assembly language statements do not match the second assembly language statements, initiate the security alert for the protected computer.

9. The method of claim 1, wherein after the first software application is loaded, further comprising:
   obtaining first assembly language statements for a predetermined number of lines of program code for the first software application starting from a beginning of the first software application;
   monitoring the protected computer with the electronic computing device;
   obtaining second assembly language statements for the predetermined number of lines of program code for the first software application starting from a beginning of the first software application;
   applying a hash function to the first assembly language statements to generate a first hash value;
   applying the hash function to the second assembly language statements to generate a second hash value;
   comparing the first hash value with the second hash value; and
   when the first hash value does not match the second hash value, initiate the security alert for the protected computer.

10. The method of claim 1, wherein the electronic computing device acts as a proxy device for the protected computer.

11. The method of claim 1, wherein the electronic computing device receives all messages and data sent to the protected computer.

12. The method of claim 1, further comprising:
   loading a second software application on the protected computer, the second software application being a revised version of the first software application;
   obtaining a third memory footprint for the second software application on the protected computer; and
   replacing the first memory footprint of the first software application with the third memory footprint of the second software application.

13. An electronic computing device comprising:
   a processing unit; and
   system memory, the system memory including instructions which, when executed by the processing unit, cause the electronic computing device to:
      obtain a first memory footprint for a software application on a protected computer, the first memory footprint comprising a state of random access memory of the protected computer in a memory range in which the software application is stored in the random access memory of the protected compute r, the electronic computing device being a separate physical electronic computing device from the protected computer;
      after a time interval, obtain a second memory footprint for the software application on the protected computer;
      comparing the first memory footprint with the second memory footprint;
      when the first memory footprint does not match the second memory footprint, initiate a security alert for the protected computer;
      obtain a first signature for the protected computer, the first signature comprising a first unique memory pattern associated with an operational aspect of the protected computer, the operational aspect comprising a computer processor cycle speed for executing a specific number of lines of computer code;
      receive a message at the protected computer;
      after the message is received, obtain a second signature for the protected computer, the second signature comprising a second unique memory pattern associated with the computer processor cycle speed for executing the specific number of lines of computer code of the protected computer;
      compare the computer processor cycle speed for executing the specific number of lines of computer code for first signature with the computer processor cycle speed for executing the specific number of lines of computer code for the second signature; and
      when there is a disparity between the first signature and the second signature, initiate the security alert for the protected computer.

* * * * *

UNITED STATES PATENT AND TRADEMARK OFFICE
CERTIFICATE OF CORRECTION

PATENT NO. : 10,637,877 B1  
APPLICATION NO. : 15/063898  
DATED : April 28, 2020  
INVENTOR(S) : Ramanathan et al.

Page 1 of 1

It is certified that error appears in the above-identified patent and that said Letters Patent is hereby corrected as shown below:

In the Claims

Column 12, Lines 22-23: Claim 13, delete "compute r" and insert --computer--

Signed and Sealed this  
Eighth Day of December, 2020

Andrei Iancu  
*Director of the United States Patent and Trademark Office*